Patented Aug. 8, 1950

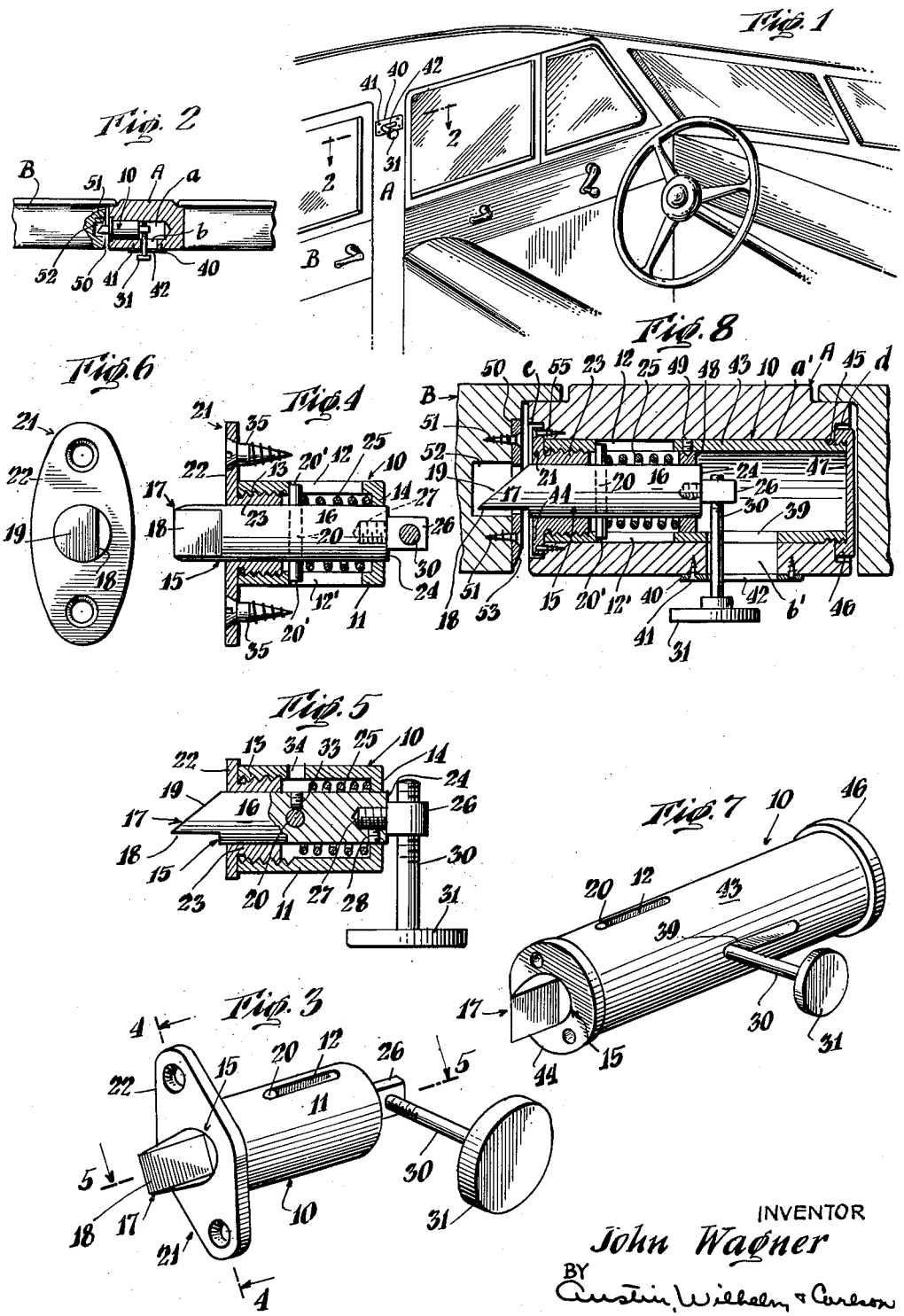

2,518,207

UNITED STATES PATENT OFFICE 2,518,207

SAFETY LATCH MECHANISM

John Wagner, Brooklyn, N. Y.

Application October 30, 1946, Serial No. 706,654

4 Claims. (Cl. 292—175)

This invention relates to an improved safety latch mechanism particularly designed to secure the rear doors of automobiles against inadvertent opening.

Motor vehicles doors are customarily provided with latch mechanisms operated by handles positioned within and without the vehicle body for holding the door in closed position, and in addition the exterior of the door is provided with a door lock which is accessible by a key from the door exterior and which may be operated by a button from the door interior. The locked door, however, can be unlocked and unlatched by a person within the vehicle body by simply manipulating the interior door handle, or the button.

Further, the rear door locking mechanism commonly used on four door sedans is constructed so that it must be manually operated after the rear door has been closed to lock the door against exterior opening. If the operator of the vehicle forgets or neglects to operate the locking mechanism of the closed rear door, the rear door could be opened from the outside, leaving valuables within the automobile in danger of being stolen.

Serious accidents and injuries have been caused to children as well as adults as a result of being thrown out of a travelling vehicle through an inadvertently opened door which has become unlatched and unlocked by accidental or prankish manipulation of the interior handle of the car door.

An object of this invention is to provide a locking device for the rear doors of automobiles operably distinct from the rear door handles thereof, and which is so placed and operated that, while it may easily be operated by the driver of the automobile, there is little or no danger that children or other rear seat occupants can open, or will unwittingly open, the rear door thereof, without the knowledge and assistance of the driver of the automobile.

Another object of this invention is to provide an an automatic locking device for the rear doors of automobiles which is simple in construction and foolproof in operation, by means of which the rear doors of automobiles are automatically locked when shut, and cannot be opened until the locking mechanism has been manually released by a person within the automobile.

Other objects and advantages of this invention will become apparent as the disclosure proceeds.

The improved safety latch mechanism constructed in accordance with this invention generally comprises a tubular casing designed to snugly fit within a horizontally extending hole drilled in the center post of a four-door automobile body, at an elevation slightly above the shoulder heighth of an average grown occupant of the front seat. A plunger is mounted to slide within the tubular casing, the plunger having a locking head. A coil spring contained within the casing operates to normally retain the locking head of the plunger extended and projecting from the locking end of the casing. The adjacent vertical edge of the rear door is provided with a latch plate and a hole or cavity therein into which the extended locking head may project in a manner to lock the rear door to the center post.

The spring pressed plunger is guided in its sliding movement within the tubular casing by a stop pin fixed to the plunger, the projecting ends of the stop pin being designed to move in corresponding elongated slots provided in the tubular casing. A manipulating stem, having an exposed grasping button, accessible to the front seat occupant is connected to and extends laterally from the rear end of the plunger, whereby the plunger may be manipulated to draw its locking head out of locking engagement with the latch plate.

This improved latch mechanism substantially eliminates the possibility of accidental opening of the rear door by rear seat occupants, since the rear seat occupant would have to simultaneously manipulate the door handle and this safety latch mechanism spaced a considerable distance from the door handle, which operation would require substantial coordination and the use of both hands. It will be further appreciated that this improved safety latch mechanism assures that the rear doors will automatically lock when swung into closed position, so that the rear door can thereafter be opened only by first obtaining access to the car interior through one of the front doors.

Although the characteristic features of this invention will be particularly pointed out in the claims appended hereto, the invention itself, and the manner in which it may be carried out, may be better understood by referring to the following description taken in connection with the accompanying drawings forming a part hereof in which Fig. 1 is an interior view of an automobile body, showing the improved latching mechanism in place on the post between the front and rear doors;

Fig. 2 is a longitudinal cross-sectional view of the improved latching mechanism in place on the car door post, as it would appear when viewed along the line 2—2 of Fig. 1;

Fig. 3 is an enlarged perspective view of the improved latching mechanism illustrating one exemplification thereof;

Fig. 4 is an enlarged cross-sectional view of the improved latching mechanism as it would appear when viewed along the line 4—4 of Fig. 3;

Fig. 5 is an enlarged cross-sectional view of the improved latching mechanism as it would appear when viewed along the line 5—5 of Fig. 3;

Fig. 6 is an elevational view of the head end of the latching mechanism shown in Fig. 3;

Fig. 7 is an enlarged perspective view of the improved latching mechanism illustrating an alternative exemplification thereof, and Fig. 8 is an enlarged cross-sectional view of the improved locking device shown in Fig. 7 as it would appear when assembled into the car door post.

Similar reference characters refer to similar parts throughout the several views of the drawings and specification.

As illustrated in Figs. 3, 4 and 5, this new and improved latching mechanism comprises a tubular casing member 10 having a tubular body wall 11 provided with diametrically opposed slots 12 and 12' in the tubular side wall thereof. The head end of the tubular casing is provided with an interior screw thread 13, and the rear end thereof is provided with an inturned lip 14 which defines a round hole axially centered with respect to the longitudinal axis of the tubular casing member.

The casing member 10 contains and houses a plunger or draw bolt 15 having a body section 16 whose diameter is such as to snugly slide within the hole defined by the inturned lip 14 of the casing member 10. The draw bolt 15 is provided with a locking head 17 presenting a locking face 18 and a cam face 19. A steel stop pin 20 extends through a fitted hole in the body section 16 of the draw bolt 15, the projecting ends 20' of the pin extending into the adjacent slots 12 and 12' in the casing member 10. Thus the draw bolt 15 may be reciprocated longitudinally in the casing member 10 a distance corresponding to the longitudinal length of the slots 12 and 12', the draw bolt being also held against rotation by the pin 20 and slots 12 and 12'.

A securing member 21, which is detachably secured to the tubular casing member 10, provides means for securing the casing member 10 and its associated draw bolt 15 within the door post A of the car. The securing member 21 comprises a plate section 22 having a cylindrical boss 23 presenting a threaded exterior which threads into the screw threads 13 of casing member 10 to thereby attach the securing member 21 to the casing member 10. The cylindrical boss portion 23 is provided with an axial bore within which the body section 16 as well as the locking head section 17 of the draw bolt 15 may snugly reciprocate. Thus the draw bolt 15 is retained and supported within the casing member 10 by the lip 13 and the cylindrical boss 23.

The locking head 17 of the latch bolt 15 is resiliently retained in a position to project from the outer face of the securing member 21 by means of a coil expansion spring 25 contained within the casing member 10 and surrounding the body section 16 of the draw bolt 15. One end of the coil spring 25 seats against the inturned lip 14 of the casing member 10 and the other end of the coil spring seats against the projecting ends 20' of the stop pin 20 fixed to the draw bolt 15. The locking head 17 is thus resiliently retained in locking position by the coil spring 25, but can be drawn into the casing member 10 against the action of the coil spring 25 by applying a pulling force to the rear end of the draw bolt.

The rear end of the draw bolt 15 is provided with a lug block 26 adapted to be attached to the rear face 24 of the draw bolt. The lug block 26 is provided with a threaded projection 27 adapted to be screwed into the rear face 24 of the draw bolt 15. The threaded portion 27 of the lug block 26 is firmly held against movement by a set screw 28 threaded into the body of the draw bolt 15, as shown more particularly in Fig. 5. The latch bolt 15 is manipulated by a stem member 30 which is preferably threaded so that it may be screwed into a threaded hole in the lug block 26, the bolt manipulating stem 30 extending at right angles to the longitudinal axis of the draw bolt 15. The outer end of the stem 30 is provided with a suitable button 31 which can be gripped in the fingers to manipulate the latch bolt 15.

The improved latching mechanism as shown in Figs. 3 to 6 inclusive is so designed to permit economical, high speed assembly thereof. In assembling this latching unit, the coil spring 25 is first positioned within the tubular casing member 10, and then the boss section 23 of the securing member 21 is threaded on to the end of the casing member 10. The latch bolt 15, with the stop pin 20 and the manipulating stem 30 removed therefrom, is then telescoped into the casing member 10 so as to freely reciprocate therein. The stop pin 20 can be readily inserted through the casing slot 12, through the receiving hole in the draw bolt 15, and into the opposite casing slot 12', the spring 25 being compressed between the stop pin 20 and the lip 14. The stop pin 20 may have a snug and tight fit within the bored hole provided therefor in the latch bolt 15 so as to be firmly retained in position with the ends thereof extending into the casing slots 12 and 12'. If desired, however, the stop pin 20 may be further held in position by a set screw 33 threaded into the body section 16 of the latch bolt 15, a hole 34 being provided in the tubular wall 11 of the casing member 15 to permit insertion and manipulation of the set screw into its threaded hole in the latch bolt 15.

In applying the latching mechanism to the door post A of the car, a suitable hole $a$ is drilled horizontally into the post for a suitable distance, sufficient to receive and contain the casing member 10 as well as the draw bolt 15 when in its drawn, unlocked position. The cylindrical hole $a$, provided in the door post should be such as to substantially conform to the diameter of the casing member 10, and should be located near the upper end of the post A, but within convenient reaching distance of the driver occupant of the car. The casing member 10 is secured and held in position by suitable screws 35 which extend through the plate section 22 of the securing member 21 and into the door post. A slot $b$ is cut into the interior face of the door post A, to provide a channel leading into the cylindrical hole $a$ cut into the door post. The width of the slot $b$ need not substantially exceed the diameter of the manipulating stem 30, and may have a length which is not substantially in excess of the longitudinal length of the slots 12 and 12' in the casing member 10.

To give the latching installation a finished appearance, a slotted chafing plate 40 may be secured over the slot $b$ as by screws 41, the chafing plate 40 having a conformed slot 42 through which the manipulating stem 30 may extend. When the casing member 10 and its associated draw bolt 15 and securing member 21 have all been finally assembled within or to the door post, the attaching end of the manipulating stem 30 may be inserted through the slot 42 of the chafing plate 40, into the slot b in the door post, and thence threaded into the lug block 26 in a manner to firmly secure the manipulating stem to the lug block. It will be noted that the manipulating stem 30 may be adjusted so that its finger grip button 31 is positioned closely adjacent the interior face of the door post, thereby providing a neat and attractive installation which enhances rather than detracts from the finished appearance of the body interior. It will be noted that the lug block 26 has a threaded stud connection with the end of the draw bolt 16, which permits longitudinal adjustment of the lug block 26 and aligning adjustment of the threaded opening in the lug block whereby the position of the threaded opening in the lug block may be adjusted to conveniently accommodate and receive the threaded end portion of the manipulating stem 30.

When the latching mechanism above described has been fully installed, a latch plate 50 is attached to the adjacent edge of the rear car door B in a position to cooperate with the locking head 17 of the latching mechanism. The latching plate 50 may be secured to the rear door B as by suitable screws 51, and is provided with a suitable hole or cavity 52 into which the projecting end of the locking head 17 may extend. The hole or cavity 52 is so shaped and formed that when the rear door is swung into closed position, the cam face 19 of the locking head 17 will cam over the latch plate 50 until the door is fully closed, whereupon the latching head 17 will automatically spring into the locking cavity 52 of the locking plate under the impelling force of the coil spring 25.

An alternative exemplification of this improved latching mechanism is illustrated in Figs. 7 and 8. In this exemplification, the tubular casing member 10 comprises a tubular body section 43 of sufficient length to extend entirely through the door post A of the car, whereas in the exemplification shown in Figs. 3 to 6 inclusive the tubular body 11 of the casing member 10 projects only part way into the door post. The securing member 21 of the exemplification shown in Figs. 8 and 9, has a plate section 44 which may be generally circular in outline as compared with the elliptical shaped plate section 22 of the unit shown in Fig. 3. The body section 43 of the casing member shown in Figs. 7 and 8 is provided with an external thread 45 at the rear end thereof to which a ring nut 46 may be secured. The ring nut 46 may have associated therewith a closure cap section 47 to close the rear end of the body section 43.

The body section 16 of the draw bolt 15 of the unit shown in Figs. 7 and 8 is supported within the tubular body section 43 by a sleeve ring 48 which may be fixed to the body section 43 as by a set screw 49. The body section 16 of the draw bolt 15 is additionally supported by the cylindrical boss section 23 of the supporting member 21 so that the draw bolt is free to reciprocate within the conforming bores of the sleeve ring 48 and the cylindrical boss section 23. The locking head 17 is normally retained in projected position by the coil spring 25, one end of which seats against the ring sleeve 48, the other end seating against the projecting ends of the stop pin 20. The threaded manipulating stem 30 is detachably secured to the lug block 26, a conformed slot 39 being provided in the tubular body section 43 through which the manipulating stem 30 extends.

To assemble the latching mechanism shown in Figs. 7 and 8, the sleeve ring 48 is inserted into and properly positioned within the body section 43 of the casing member 10, and held in place by set screw 49. The coil spring 25 is telescoped into the open end of the body section 43 and seated upon the sleeve ring 48. The securing member 21 is then attached to the casing member 10 by threading the boss section 23 thereof into the threaded end of the body section 43. The body section 16 of the draw bolt 15 is then inserted into the body section so as to reciprocate in the ring sleeve 48 and boss section 23. The stop pin 20 is then inserted into the slot 12 of the body section 43 of the casing member 10 and through the conformed hole in the body section 16 of the draw bolt 15, so that the ends 20' of the pin 20 project into the slots 12 and 12' in the body section 43 of the casing member 10, with one end of the coil spring 25 abutting against the projecting end 20' of the pin 20. For shipment purposes, the manipulating stem 30 may be attached to the lug block 26 and the overhanging ring nut 46 attached to the rear end of the body section 43 of the casing member.

To install the latching mechanism exemplified in Figs. 7 and 8 in the door post A of a four-door automobile, a horizontally extending hole a' is drilled completely through the door post A. A slot b', which leads into the horizontally extending hole or passage a', is cut through the interior face of the door post. A receiving recess c, shaped to snugly receive the overhanging flange portion of the plate section 44, may be cut into the edge face of the door post. A similar receiving recess d designed to receive the overhanging portions of the securing ring nut 46, may also be cut in the opposite vertical edge of the door post.

With the ring nut 46 removed, the tubular section 43 of the casing member 1 is inserted into the drilled hole passage a', and the plate section 44 of the securing member 21 secured to the door post as by one or more small screws 55. The ring nut 46 is then threaded onto the rear end of the body section 43 of the casing member and suitably tightened to hold the casing member 10 firmly in place. The slotted chafing plate 40 is attached to the interior face of the door post A directly over the slot b', and the manipulating stem 30 then inserted through the slot b' and threaded and attached to the lug block 26 of the draw bolt 15. It will also be noted that the lug block 26 associated with the construction shown in Figs. 7 and 8 may be adjusted as required to position the threaded opening in the lug block as conditions require to conveniently accommodate and receive the threaded end portion of the manipulating stem 30.

As the final assembly operation, the latch plate 50 is attached to the adjacent edge of the rear door B, care being taken so that the latching hole or socket 52 is properly located to receive the locking head 17 of the draw bolt. The locking plate 50 may present a tapered face 53 so that the cam face 19 of the locking head will smoothly slide thereover.

It will be observed that when this improved latching mechanism has been installed in the center post of the car in the manner above described, the rear door B of the car can only be opened from closed position by grasping the manipulating button 31 and pulling the same along the slot 42 in the chafing plate 40 with sufficient force so as to overcome the action of the coil spring 25 and to thereby withdraw the locking head 17 from the locking cavity 52 in the lock plate 50. Upon release of the manipulating button 31, the coil spring 25 will drive the locking head 17 into its normally extended position, so that when the rear door is swung into closed position, the door will be locked in closed position and releasable only by manipulating the release button 31 as indicated. Thus when the rear door is closed, it is automatically locked and entry into the car interior through this door is prevented until access to the interior is had so as to manipulate the latch button 31.

Nor can the rear seat occupant of the car carelessly or inadvertently open the rear door by manipulating the door handle C of the rear door B. Opening of the rear door B requires coordinated and simultaneous manipulation of the interior car door handle C as well as the latching button 31 of the latching mechanism. This improved latching mechanism thus provides a safety device whereby children or adult occupants of the rear seat cannot unintentionally, inadvertently or playfully open the rear door of the car. Thus the danger of theft of valuables left in the automobile is minimized and the danger of injury to children riding in the rear seat is substantially obviated.

This improved locking device is simple and sturdy in construction, inexpensive to manufacture, and can be readily and quickly installed in the center post of substantially any four-door car with a minimum of labor.

While certain novel features of the invention have been disclosed herein, and are pointed out in the annexed claims, it will be understood that various omissions, substitutions, and changes may be made by those skilled in the art without departing from the spirit of the invention.

What is claimed is:

1. A latching mechanism designed for installation within the center post of a four door automobile at approximately the shoulder level of the seated driver, said mechanism including in combination, a tubular casing, a draw bolt having a latching head designed to reciprocate in said casing, an adjustable mounting member for one end of said casing having an attaching plate section and a boss section threaded into one end of said tubular casing, said boss section having an axial bore designed to slidably receive the body of said draw bolt and snugly guide the draw bolt in its reciprocating movement, adjustable mounting means for the other end of said casing comprising a ring nut having a threaded connection therewith, and a manipulating stem extending laterally from said draw bolt.

2. A latching mechanism designed for installation within the center post of a four door automobile, said mechanism including in combination, a tubular casing, a draw bolt having a latching head designed to reciprocate in said casing, a mounting member for one end of said casing having an attaching plate section and a boss section threaded into one end of said tubular casing, said boss section having an axial bore designed to slidably receive and guide the draw bolt adjacent the latching head thereof, said casing having an internal shoulder portion presenting an axial bore spaced from said boss section designed to slidably receive and guide the draw bolt adjacent the other end thereof, an adjustable ring nut having a threaded connection with the other end of said tubular casing for supporting the same in mounted position, and a stem member secured to and projecting laterally from said draw bolt for manipulating the draw bolt.

3. A latching mechanism designed for installation within the center post of a four door automobile, said mechanism including in combination, a tubular casing, a draw bolt having a latching head designed to reciprocate in said casing, a mounting member for said casing having an attaching plate section and a boss section threaded into said tubular casing, said boss section having an axial bore designed to slidably receive and guide said draw bolt adjacent the latching head thereof, said casing having an internal shoulder portion presenting an axial bore spaced from said boss section designed to slidably receive and guide the draw bolt adjacent the rear end thereof, an abutment pin fixed to said draw bolt presenting end portions projecting into guide slots extending longitudinally through the tubular body wall of said casing member for guiding the axial movement of said draw bolt in said casing, a coil spring embracing a body section of said draw bolt having one end thereof seating against said shoulder portion and the other end thereof seating against the ends of said abutment pin, a stem member secured to and projecting laterally from said draw bolt for manipulating said draw bolt.

4. A latching mechanism designed for installation within the center post of a four door automobile, said mechanism including in combination, a tubular casing, a draw bolt having a latching head designed to reciprocate in said casing, a mounting member for said casing having an attaching plate section and a boss section threaded into one end of said tubular casing, said boss section having an axial bore designed to slidably receive and guide the draw bolt adjacent the latching head thereof, said casing having an internal shoulder portion presenting an axial bore spaced from said boss section designed to slidably receive and guide the draw bolt adjacent the rear end thereof, an abutment pin fixed to said draw bolt presenting end portions projecting into guide slots extending longitudinally through the tubular body wall of said casing for guiding the axial movement of said draw bolt in said casing, a coil spring embracing a body section of said draw bolt having one end thereof seating against said shoulder portion and the other end thereof seating against the ends of said abutment pin, an adjustable ring nut having a threaded connection with the other end of said tubular casing for supporting and securing the same in mounted position, and a stem member secured to and projecting laterally from said draw bolt for manipulating the draw bolt.

JOHN WAGNER.

REFERENCES CITED

The following references are of record in the file of this patent:

UNITED STATES PATENTS

| Number | Name | Date |
|---|---|---|
| 127,027 | Clark | Mar. 21, 1872 |
| 630,594 | Conant | Aug. 8, 1899 |
| 1,517,817 | Aufderheide | Dec. 2, 1924 |
| 1,578,598 | Gidney | Mar. 30, 1926 |
| 1,624,819 | Wolford | Apr. 12, 1927 |
| 2,221,529 | Schoenheit | Nov. 12, 1940 |

FOREIGN PATENTS

| Number | Country | Date |
|---|---|---|
| 280,466 | Great Britain | Nov. 17, 1927 |